US012780208B2

(12) United States Patent
Selvaraju et al.

(10) Patent No.: US 12,780,208 B2
(45) Date of Patent: Nov. 3, 2026

(54) SYSTEMS AND METHODS FOR GAP SELECTION FOR LANE CHANGE SITUATIONS USING ORDERED ANALYSIS RESULTS

(71) Applicant: Torc Robotics, Inc., Blacksburg, VA (US)

(72) Inventors: Pradeep Illayaperumal Selvaraju, Blacksburg, VA (US); Joseph Adkisson, Blacksburg, VA (US)

(73) Assignee: Torc Robotics, Inc., Blacksburg, VA (US)

( * ) Notice: Subject to any disclaimer, the term of this patent is extended or adjusted under 35 U.S.C. 154(b) by 115 days.

(21) Appl. No.: 18/535,466

(22) Filed: Dec. 11, 2023

(65) Prior Publication Data

US 2025/0187599 A1 Jun. 12, 2025

(51) Int. Cl.
*B60W 30/18* (2012.01)
*B60W 60/00* (2020.01)

(52) U.S. Cl.
CPC .... *B60W 30/18163* (2013.01); *B60W 60/001* (2020.02); *B60W 2554/80* (2020.02)

(58) Field of Classification Search
None
See application file for complete search history.

(56) References Cited

U.S. PATENT DOCUMENTS 10,824,153 B2 11/2020 Zhang et al.
2020/0307589 A1 10/2020 Li et al.
2021/0094577 A1* 4/2021 Shalev-Shwartz ... G05D 1/0231
2021/0197858 A1* 7/2021 Zhang ............. B60W 30/18163
2022/0135078 A1 5/2022 Refaat et al.
2022/0363256 A1 11/2022 Dax

* cited by examiner

*Primary Examiner* — Donald J Wallace
*Assistant Examiner* — Paysun Wu
(74) *Attorney, Agent, or Firm* — Armstrong Teasdale LLP

(57) ABSTRACT

A gap evaluation system for evaluating potential gaps for lane change operations of an autonomous vehicle, wherein the system is configured to receive, from the plurality of sensors, sensor data corresponding to a plurality of potential gaps, transmit sensor data to the at least one processor, generate a profile for each potential gap using the sensor data, retrieve a plurality of gap rules from the at least one memory, wherein each gap rule is directed to a characteristic of a potential gap and wherein each gap rule comprises a threshold value corresponding to the characteristic, evaluate each gap against the plurality of gap rules by comparing the profile for each potential gap to the threshold value of each gap rule, and generate a prioritized list of gaps based on the evaluation of the plurality of potential gaps.

19 Claims, 7 Drawing Sheets

300

| Rank (304) | Rule Description (306) | Type (308) | Threshold Value (310) |
|---|---|---|---|
| 1 | Max Accel Proximity | Required | 30.0 |
| 2 | Overshoot | Required | 1.0 |
| 3 | Front Relative Speed | Required | 7.5 |
| 4 | Inconvenience | Required | 8.0 |
| 5 | Rear Relative Speed | Required | 5.0 |
| 6 | Prevent Slowdown | Required | 8.0 |
| 7 | Distance to End | Optional | 4.0 |
| 8 | Max Accel Proximity | Optional | 15.0 |
| 9 | Average Gap Size | Optional | 10.0 |
| 10 | Prevent Slowdown | Optional | 5.0 |
| 11 | Overshoot | Optional | 0.0 |
| 12 | Average Gap Size | Optional | 20.0 |
| 13 | Time from Ideal Profile | Optional | 6.0 |
| 14 | Inconvenience | Optional | 1.0 |
| 15 | Max Accel Proximity | Optional | 15.0 |
| 16 | Front Relative Speed | Optional | 6.0 |
| 17 | Time from Ideal Profile | Optional | 4.0 |
| 18 | Average Gap Size | Optional | 25.0 |

302 302

FIG. 3

400

| | Gap1.results | Gap2.results | Gap3.results |
|---|---|---|---|
| Rule1 | True | True | False |
| Rule2 | True | False | No result |
| Rule3 | True | No result | No result |

FIG. 4

| Gap | Score | Priority |
|---|---|---|
| Gap 3 | 32 | 1 |
| Gap 2 | -77 | 2 |
| Gap 1 | -986 | N/A |
| Gap 4 | -9999 | N/A |

SYSTEMS AND METHODS FOR GAP SELECTION FOR LANE CHANGE SITUATIONS USING ORDERED ANALYSIS RESULTS

TECHNICAL FIELD

The field of the disclosure relates generally to decision making of autonomous vehicles and, more specifically, decision making pertaining to analyzing and selecting a gap for a lane change operation of an autonomous vehicle.

BACKGROUND OF THE INVENTION

Autonomous vehicles are constantly evaluating their environment and analyzing data in order to make decisions about future operations of the vehicle. Autonomous vehicles receive large amounts of sensor data that is then processed in order to provide context on the environment in relation to the operation of the autonomous vehicle.

Merging, lane changing, and passing of slower vehicles are important functions during operation of autonomous vehicles on roadways. Once an autonomous vehicle has indicated a lane change is necessary, it needs to decide when and where to make the lane change. Accordingly, the autonomous vehicle needs to identify one or more gaps (e.g. empty spaces between or around the vehicles in the vicinity of the autonomous vehicle) to perform the lane change. At any given time, there are several gaps available where the lane change may take place. The autonomous vehicle can evaluate the gaps in a number of ways and will ideally select the best of these gaps to perform the lane change.

One known method of gap selection for a lane change is executed by determining a score associated with each possible gap based on a sum of weighted averages associated with different characteristics of the gap. For example, for each gap, there may be a list of characteristics, wherein each characteristic is evaluated and given a numeric score. The characteristic score may then be weighted based on the importance of the characteristic. The sum of all the weighted characteristic scores indicates the overall score for the gap. Finally, a gap may be selected by comparing the overall score of each of the gaps.

While this method allows for accounting for many factors, it can be difficult to interpret the score without having a deep understanding of the characteristics being used and the weights assigned to each of the characteristics. This can make it difficult for a human to understand the score and troubleshoot the algorithm if undesired behavior is observed. Further, not all gaps need to be fully evaluated. If a given gap is unacceptable based on one important characteristic (e.g., the gap is too small to accommodate the autonomous vehicle), there may be no need to continue to evaluate the gap by devoting computing resources and time.

Therefore, a need exists for a simplified and efficient method of evaluating gaps, wherein an overall result is easily parsed, allowing for easier troubleshooting.

This section is intended to introduce the reader to various aspects of art that may be related to various aspects of the present disclosure described or claimed below. This description is believed to be helpful in providing the reader with background information to facilitate a better understanding of the various aspects of the present disclosure. Accordingly, it should be understood that these statements are to be read in this light and not as admissions of prior art.

SUMMARY OF THE INVENTION

In one aspect, a gap evaluation system for evaluating potential gaps for lane change operations of an autonomous vehicle including a plurality of sensors, the gap evaluation system including at least one processor and at least one memory, wherein, upon receiving an indication for a lane change operation, the processor is configured to receive, from the plurality of sensors, sensor data corresponding to a plurality of potential gaps, transmit sensor data to the at least one processor, generate a profile for each potential gap using the sensor data, retrieve a plurality of gap rules from the at least one memory, wherein each gap rule is directed to a characteristic of a potential gap and wherein each gap rule comprises a threshold value corresponding to the characteristic, evaluate each gap against the plurality of gap rules by comparing the profile for each potential gap to the threshold value of each gap rule, and generate a prioritized list of gaps based on the evaluation of the plurality of potential gaps.

In another aspect, a method of selecting a gap for a lane change operation of an autonomous vehicle, the method including receiving, from a plurality of sensors, sensor data corresponding to a plurality of potential gaps, transmitting the sensor data to at least one processor, generating a profile for each potential gap using the sensor data, retrieving a plurality of gap rules from at least one memory, wherein each gap rule is directed to a characteristic of a potential gap and wherein each gap rule comprises a threshold value corresponding to the characteristic, evaluating each gap against the plurality of gap rules by comparing the profile for each potential gap to the threshold value of each gap rule, and generating a prioritized list of gaps based on the evaluation of the plurality of potential gaps.

In yet another aspect, an autonomous vehicle including a plurality of sensors, and a gap evaluation system including at least one processor and at least one memory, wherein, upon receiving an indication for a lane change operation, the processor is configured to receive, from the plurality of sensors, sensor data corresponding to a plurality of potential gaps, transmit sensor data to the at least one processor, generate a profile for each potential gap using the sensor data, retrieve a plurality of gap rules, wherein each gap rule is directed to a characteristic of a potential gap and wherein each gap rule comprises a threshold value corresponding to the characteristic, evaluate each gap against the plurality of gap rules by comparing the profile for each potential gap to the threshold value of each gap rule, and generate a prioritized list of gaps based on the evaluation of the plurality of potential gaps.

Various refinements exist of the features noted in relation to the above-mentioned aspects. Further features may also be incorporated in the above-mentioned aspects as well. These refinements and additional features may exist individually or in any combination. For instance, various features discussed below in relation to any of the illustrated examples may be incorporated into any of the above-described aspects, alone or in any combination.

BRIEF DESCRIPTION OF DRAWINGS

The following drawings form part of the present specification and are included to further demonstrate certain aspects of the present disclosure. The disclosure may be better understood by reference to one or more of these drawings in combination with the detailed description of specific embodiments presented herein.

FIG. 3 is an example of a set of gap rules;

FIG. 4 is an example of a vector representation of the output of the gap selection algorithm;

Figure 1A:
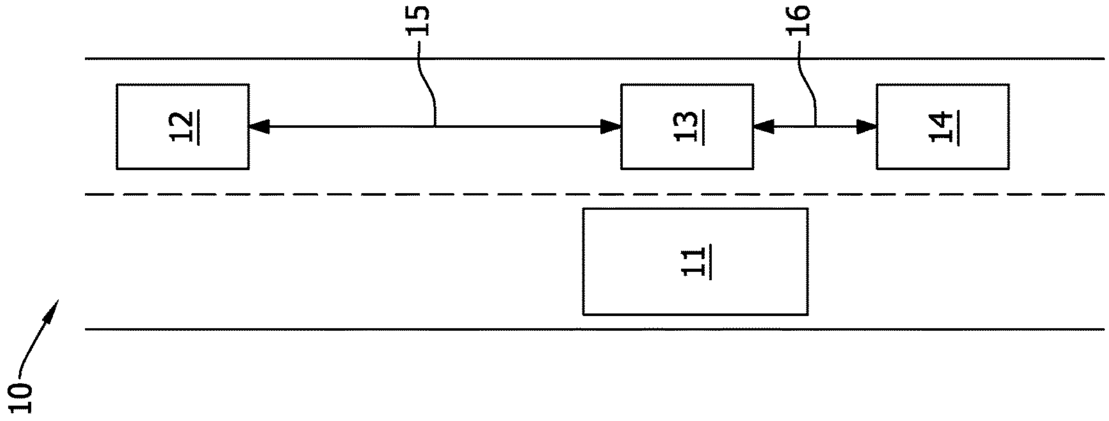
FIG. 1A is an example of a potential lane change scenario.

Corresponding reference characters indicate corresponding parts throughout the several views of the drawings. Although specific features of various examples may be shown in some drawings and not in others, this is for convenience only. Any feature of any drawing may be reference or claimed in combination with any feature of any other drawing.

DETAILED DESCRIPTION

The following detailed description and examples set forth preferred materials, components, and procedures used in accordance with the present disclosure. This description and these examples, however, are provided by way of illustration only, and nothing therein shall be deemed to be a limitation upon the overall scope of the present disclosure.

As described briefly above, autonomous vehicles operating in a highway environment are frequently required to perform merge or lane change operations in order to navigate current traffic conditions. These lane change operations may occur as a vehicle is on an entrance ramp to a freeway or interstate or any time the vehicle needs to change lanes on a roadway. In order to successfully change lanes, the autonomous vehicle needs to identify a gap large enough to accommodate the vehicle and that is reachable by the vehicle given the speeds being traveled by the autonomous vehicle and surrounding traffic. As described herein, the term "lane change" describes any scenario where the autonomous vehicle is preparing to change lanes in traffic (e.g., merging to pass slower vehicles, entering an interstate, merging due to a lane ending, etc.)

FIG. 1A is an example of a potential lane change scenario 10. In this scenario 10, autonomous vehicle 11 is traveling in the left lane, and vehicles 12, 13, 14 are travelling in the right lane. The autonomous vehicle 11 receives a command from its operating system to merge into the right lane. Potential gaps 15, 16 are identified The autonomous vehicle 11 may consider gaps ahead or behind its current position. Additional potential gaps may also be identified ahead of vehicle 12 or behind vehicle 14. Autonomous vehicle 11 needs to select an acceptable gap to perform a lane change operation. In this scenario 10, autonomous vehicle may select gap 15 as the best gap.

Figure 1B:
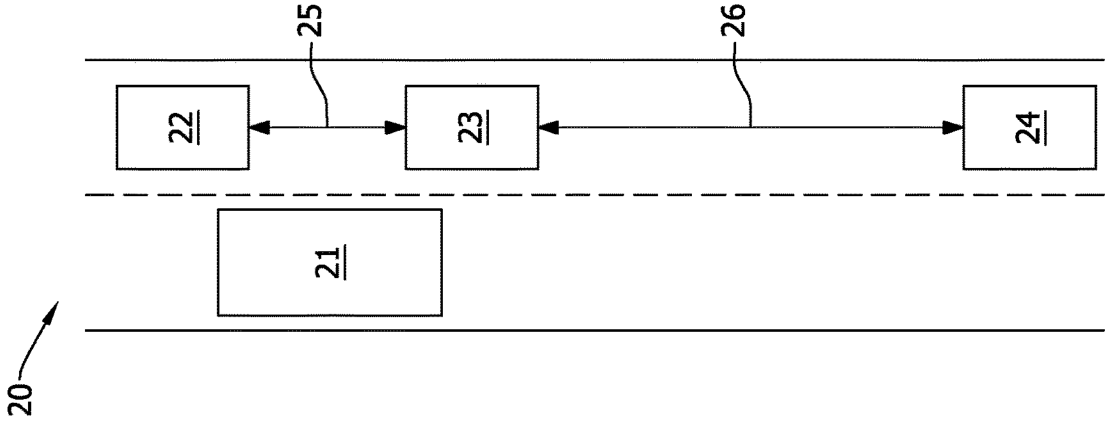
FIG. 1B is another example of a potential lane change scenario.

FIG. 1B is another example of a potential lane change scenario 20. In this scenario 20, autonomous vehicle 21 is traveling in the left lane, and vehicles 22, 23, 24 are travelling in the right lane. The autonomous vehicle 21 receives a command from its operating system to merge into the right lane. Potential gaps 25, 26 are identified. Additional gaps may be identified ahead of vehicle 22 or behind vehicle 24. In this scenario 20, autonomous vehicle may select gap 26 as the best gap.

Figure 1C:
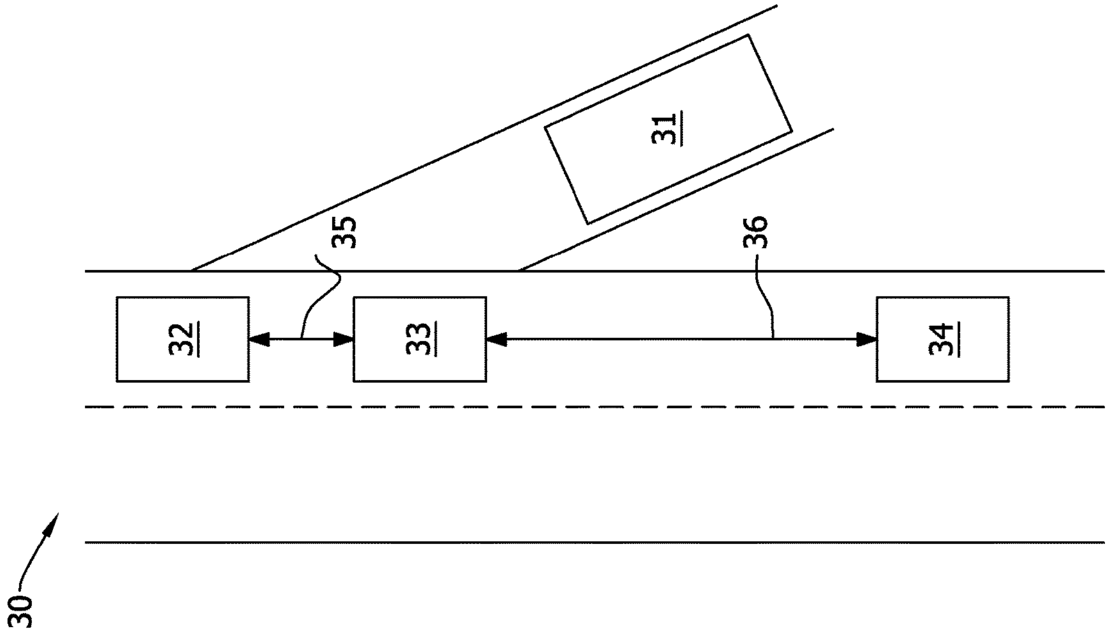
FIG. 1C is yet another example of a potential lane change scenario.

FIG. 1C is yet another example of a potential lane change scenario 30. In this scenario 30, autonomous vehicle 31 is traveling on an entrance ramp and vehicles 32, 33, 34 are travelling in the right lane. The autonomous vehicle 31 needs to identify a gap within which to merge into the existing traffic. Potential gaps 35, 36 are identified. Additional gaps may be identified ahead of vehicle 32 or behind vehicle 34. In this scenario, autonomous vehicle may select gap 36 as the best gap.

Many factors are considered by the disclosed system when identifying a suitable gap. These factors include the size of the gap, the acceleration required to reach the gap, the time to reach the gap, the speed relative to the front vehicle of the gap, the speed relative to the rear vehicle of the gap, etc. Any number of relevant factors may be used by the disclosed system.

Figure 2A:
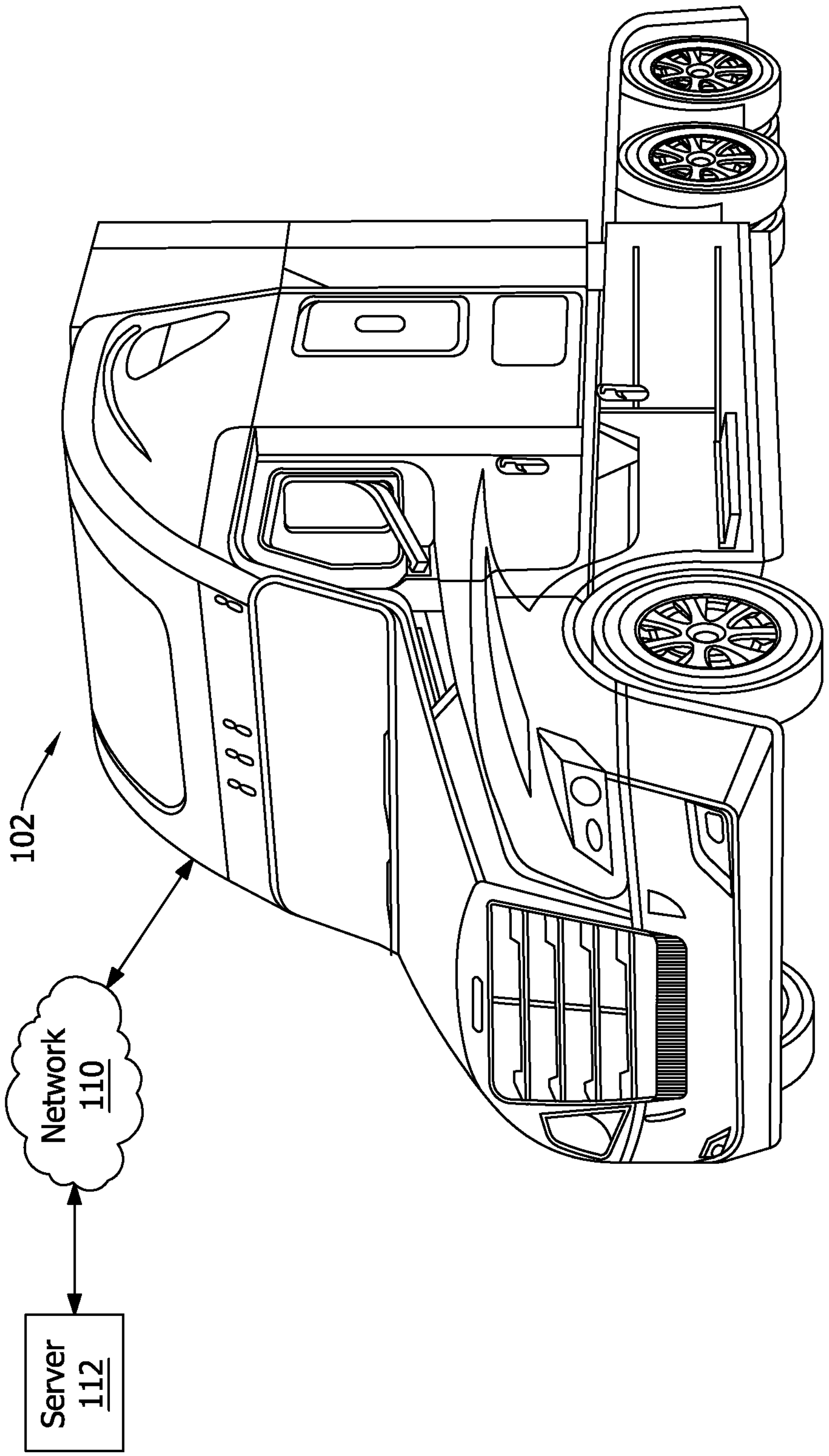
FIG. 2A depicts an autonomous vehicle.

FIG. 2A depicts an autonomous vehicle 102. Autonomous vehicle 102 includes an autonomy system that may be completely autonomous (fully autonomous), such as self-driving, driverless, or Level 4 autonomy, or semi-autonomous, such as Level 3 autonomy. As used herein the term "autonomous" includes both fully autonomous and semi-autonomous. The autonomy system may be structured on at least three aspects of technology: (1) perception, (2) maps/localization, and (3) behaviors planning and control.

The function of the perception aspect is to sense an environment surrounding the vehicle 102 and interpret the environment. To interpret the surrounding environment, a perception module or engine in the autonomy system of the vehicle 102 may identify and classify objects or groups of objects in the environment. For example, a perception module may be associated with various sensors (e.g., light detection and ranging (LiDAR), camera, radar, etc.) of the autonomy system and may identify one or more objects (e.g., pedestrians, vehicles, debris, etc.) and features of the roadway (e.g., lane lines) around the vehicle 102, and classify the objects in the road distinctly.

The maps/localization aspect of the autonomy system may be configured to determine where on a pre-established digital map the vehicle 102 is currently located. One way to do this is to sense the environment surrounding the vehicle 102 (e.g., via the perception module), such as by detecting vehicles (e.g., a vehicle) or other objects (e.g., traffic lights, speed limit signs, pedestrians, signs, road markers, etc.) from data collected via the sensors of the autonomy system, and to correlate features of the sensed environment with details (e.g., digital representations of the features of the sensed environment) on the digital map.

Once the systems on the vehicle 102 have determined the location of the vehicle 102 with respect to the digital map features (e.g., location on the roadway, upcoming intersections, road signs, etc.), the vehicle 102 can plan and execute maneuvers and/or routes with respect to the features of the digital map. The behaviors, planning, and control aspects of the autonomy system may be configured to make decisions about how the vehicle 102 should move through the environment to get to the goal or destination of the vehicle 102. The autonomy system may consume information from the perception and maps/localization modules to know where the vehicle 102 is relative to the surrounding environment and what other objects and traffic actors are doing.

The vehicle 102 is capable of communicatively coupling to a remote server 112 via a network 110. The vehicle 102 may not necessarily connect with the network 110 or the server 112 while it is in operation (e.g., driving down the roadway). That is, the server 112 may be remote from the vehicle, and the vehicle 102 may deploy with all the necessary perception, localization, and vehicle control software and data necessary to complete the vehicle 102's mission fully autonomously or semi-autonomously.

While this disclosure refers to a vehicle 102 as the autonomous vehicle, it is understood that the vehicle 102 could be any type of vehicle including a truck (e.g., a tractor trailer), an automobile, a mobile industrial machine, etc. While the disclosure will discuss a self-driving or driverless autonomous system, it is understood that the autonomous system could alternatively be semi-autonomous having varying degrees of autonomy or autonomous functionality. While the perception module is depicted as being located at the front of the vehicle 102, the perception module may be a part of a perception system with various sensors placed at different locations throughout the vehicle 102.

Figure 2B:
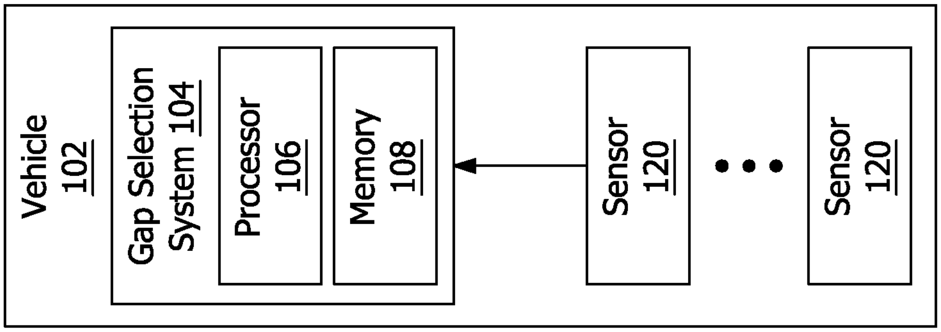
FIG. 2B is a block diagram of the autonomous vehicle including a gap selection system that executes a gap selection algorithm.

FIG. 2B is a block diagram of the vehicle 102 that executes a gap selection algorithm. The autonomous vehicle 102 includes a gap selection system 104 having at least one processor 106 and at least one memory 108. The gap selection system 104 is a part of the autonomy system described above. The vehicle 102 further includes a plurality of sensors 120. The plurality of sensors 120 each transmit information to the gap selection system 104. The processor 106 of the gap selection system 104 executes the gap selection algorithm. The output of the gap selection algorithm is a prioritized list of gaps that may be stored in memory 108 or transmitted to other systems of the autonomous vehicle 102.

Prior to executing a lane change operation, the gap selection system 104 identifies a plurality of gaps and generates a gap object corresponding to each gap. Each gap object includes data associated with the corresponding gap and is stored as a vector in memory 108. Each gap object includes data directly received from sensors 120 and/or data calculated by the processor 106 utilizing data from the sensors 120. The sensors 120 are constantly receiving new data and updating the gap objects. Memory 108 also stores a set of gap rules which are retrieved by the processor when executing the gap selection algorithm. The gap objects and the gap rules are inputs into the gap selection algorithm. Each gap object is evaluated against the gap rules.

FIG. 3 is an example of a set 300 of gap rules. Each row represents a rule 302 that each gap is evaluated against. The result of this evaluation results in a logical true or logical false outcome. Each rule 302 is assigned a rank 304 which determines the order in which the rule 302 is evaluated against each gap. Rules are evaluated in order of their priority, e.g. the first rule evaluated is considered to have the highest priority. Each rule 302 further includes a rule description 306. The rule description 306 is an abbreviated description of the rule. More detailed descriptions of each of the rules are listed below:

Max Accel Proximity: For a given time, M seconds, the autonomous vehicle should be able to reach the gap, considering maximum acceleration is applied towards the gap.

Overshoot: The autonomous vehicle should be able to decelerate to keep from passing the gap (or accelerate enough to prevent the gap from passing the autonomous vehicle) for a given time, P seconds. Further, if the autonomous vehicle cannot avoid passing the gap or being passed by the gap during those P seconds, it should be able to regain a position inside the gap within Q seconds (intended for scenarios where position can be matched, but not speed).

Front/Rear Relative Speed: A measure of the autonomous vehicle's speed in relation to the gap's speed, measured by determining whether the average speed of the gap's front/rear endpoint is within S m/s of the autonomous vehicle's average speed within T seconds.

Distance to End: The autonomous vehicle should be able to reach the gap and perform a lane change with at least X meters to spare before the end of a merge.

Time from Ideal Profile: An "ideal profile" can be defined for an ideal lane change operation if it were not constrained to the available gaps. Within the next B seconds, the gap would ideally be within C seconds of the ideal profile.

Prevent Slowdown: The autonomous vehicle should reject gaps behind the autonomous vehicle that can't be reached within D seconds if the autonomous vehicle has <E seconds left to change lanes.

Average Gap Size: The gap should be at lease F meters larger than the length of the autonomous vehicle.

Inconvenience: The autonomous vehicle should maintain a distance of G meters from the nearest vehicle behind it, so that the vehicle does not need to brake aggressively to avoid the autonomous vehicle Each rule 302 is also classified into a type 308: required or optional. A given gap must pass all required rule in order to be considered a valid gap. The same gap may fail one or more optional rules and still be considered a valid gap. Each rule 302 also includes a threshold value 310. The gap is compared against the threshold values 310 to determine the logical true or logical false result for each rule 302. The processor 106 may be required to perform a calculation based on the sensor data in order to generate the value corresponding to each rule 302 such that it may be compared against the threshold value 310.

By way of example, the first ranked required rule evaluates maximum acceleration proximity (max accel proximity). The required maximum acceleration proximity rule has a corresponding threshold value of 30 seconds. Therefore, any gap which returns a value of greater than 30 seconds, would fail the required maximum acceleration proximity rule. Any gap which returns a value of 30 seconds or less, would pass the required maximum acceleration proximity rule. Any gap which fails the required maximum acceleration proximity gap rule would not be considered as a valid gap.

An optional maximum acceleration proximity rule (ranked 8th) is also included in the set 300. The optional maximum acceleration proximity rule has a corresponding threshold value of 15 seconds. Therefore, any gap which returns a value greater than 15 seconds, would fail the optional maximum acceleration proximity rule. Any gap which returns a value of 15 seconds or less, would pass the optional maximum acceleration proximity rule. A gap may fail the optional maximum acceleration proximity rule and still be considered a valid gap, given that it passes all the required rules. A valid gap must pass all the required rules. However, the more optional rules a valid gap passes results in an overall higher priority score, which will be described below.

As demonstrated in the above example, rules may be applied to evaluate the same criteria, but against different threshold values. In the example above, the required maximum acceleration proximity rule has a threshold value of 30 seconds, however, the optional maximum acceleration rule has a threshold value of 15 seconds. In other words, the maximum acceleration proximity must be no greater than 30 seconds, but ideally, it will be no greater than 15 seconds.

FIG. 4 is an example of a vector representation of the output valid gaps of the gap selection algorithm. Each column represents the results of each gap which is stored in memory as a vector of binary values. Each binary value corresponds to the result of an analysis of the given gap against a given rule. In this example, three gap objects are shown, and the evaluation is in progress (Gap1, Gap2, Gap3). For Gap1, Rule1, Rule2, and Rule3 have all passed. For Gap2, Rule1 has passed, but Rule2 has failed. In some cases, the evaluation may be paused once a gap rule has failed, therefore, the third rule (Rule3) has yet to be analyzed for this particular gap. Further, Gap3 has failed Rule1 and evaluation has been paused, such that Rule2 and Rule3 have yet to be analyzed for Gap3.

A plurality of gap rules is considered for each gap. For each gap, each gap rule is compared against a corresponding characteristic of the gap. The gap rule includes an acceptable value or threshold for each corresponding characteristic. A comparison is made of the threshold value of each gap rule to the corresponding characteristic of the gap. The result of the comparison is a binary or logical (true or false) value. The results of each of the gap rules are compiled into an overall score for the gap. The score can further be used to define a priority relating to the gap, wherein a higher priority represents a more desirable gap.

For example, one of the gap rules may be evaluating maximum acceleration proximity. Maximum acceleration proximity refers to the time it takes to reach the gap if maximum acceleration is applied. The maximum acceleration proximity gap rule may have a threshold value of 10 seconds. Therefore, any gap that returns a value of less than 10 seconds, would fail the maximum acceleration proximity gap rule. Any gap which returns a value of 10 seconds or greater, would pass the maximum acceleration proximity gap rule.

Further, each gap rule can be classified as required or optional. A gap must pass all the required gap rules in order to be considered as a valid gap. As described herein, a "valid gap" will refer to a gap meeting the minimum requirements for a lane change operation. If a gap fails a required gap rule, that gap is automatically considered an invalid gap. The gap rules are ranked in order of importance and each gap is evaluated against the plurality of gap rules in the order of importance or priority. Further, evaluation of a gap may be paused or stopped upon a failed result for any given gap rule. By pausing or stopping the evaluation of an unacceptable gap as soon as possible, computing resources are conserved for evaluating gaps with higher potential.

Figure 5:
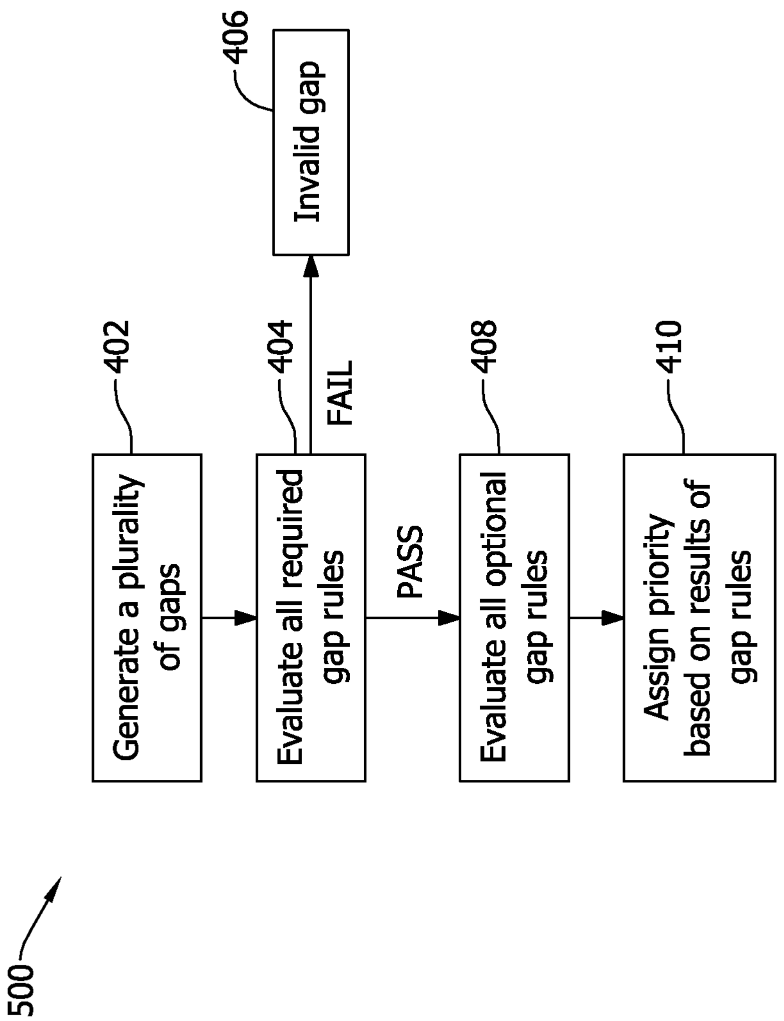
FIG. 5 is a flowchart of the gap selection algorithm.

FIG. 5 is a visual representation of the disclosed gap selection algorithm 500 executed by a processor such as processor 106 shown in FIG. 1. The algorithm employs gap evaluates the gaps (e.g. as shown in FIG. 1) based upon the gap rules (see FIG. 3). A plurality of gaps is generated 402 and given an initial priority. This initial priority may be random, or it may be based upon an initial gap rule. In general, the initial priority has low impact on the overall priority score.

Next, each gap is evaluated 404 against any required gap rules. In order for a gap to be considered valid, it must pass all required gap rules. There may be any number of required gap rules. The required gap rules may be evaluated serially or in parallel. If a given gap fails any of the required gap rules, it is considered invalid at step 406, and further evaluation is paused. If the gap passes all required gap rules, it is further evaluated in step 408. Any gaps which pass all required gap rules are considered valid gaps.

In step 408, each gap is evaluated against any optional gap rules. Optional gap rules are not required, but gaps which pass all the optional gap rules will be given a higher priority than gaps which pass none of the optional gap rules.

In step 410, the gap selection algorithm outputs a list of valid gaps, with each of the gaps being assigned a priority based on the results of the gap rules. Invalid gaps are not considered suitable as options for a potential lane change operation, due to failing at least one required gap rule. The valid gaps are all suitable for a lane change operation. That is, the highest ranked valid gap passes every required gap rule and has the highest priority score.

Figure 6:
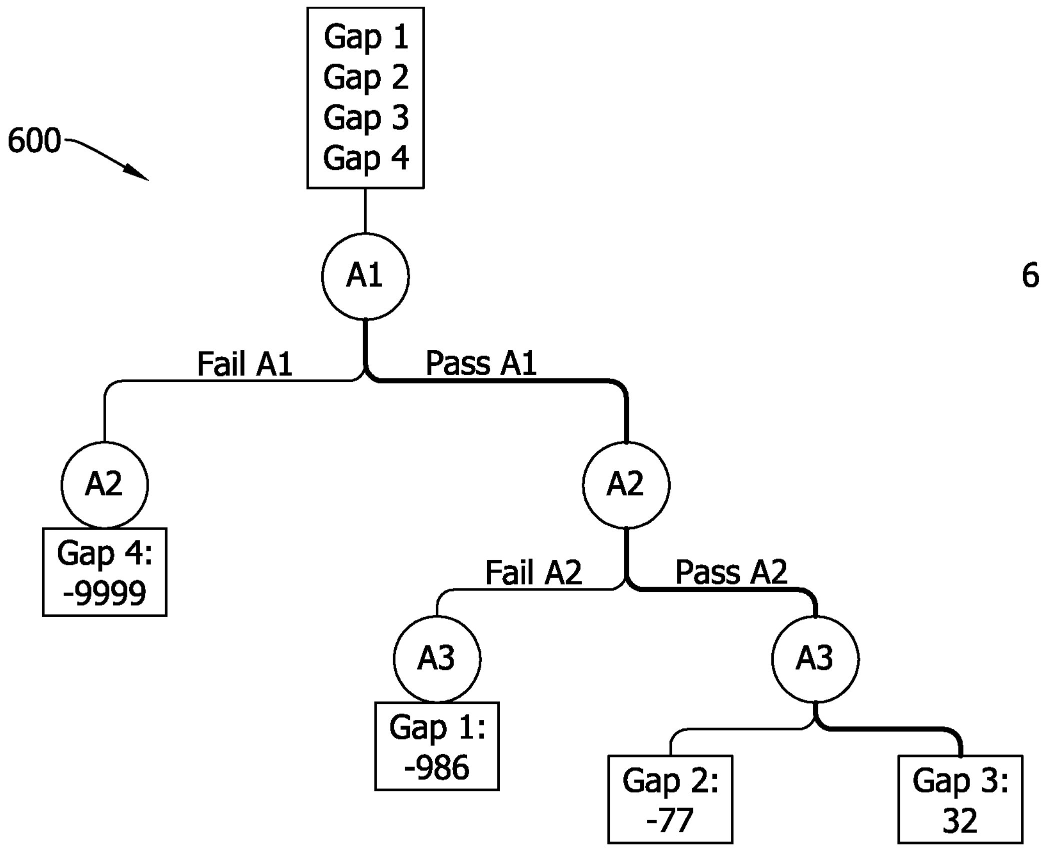
FIG. 6 is a visual representation of an example outcome of the scoring of a plurality of gaps.

FIG. 6 is a visual representation of an example outcome of the scoring of a plurality of gaps using the gap selection algorithm 500 shown in FIG. 5. Numeric values are assigned to the priority of each gap throughout the evaluation. The numeric value is adjusted in magnitude according to the impact of passing or failing each gap rule. In this example, A1 and A2 are required gap rules. A large negative impact is applied to any gap failing a required gap rule, e.g. A1 or A2. Further, a first level required gap rule, A1, has a larger negative impact than a second level gap rule, A2. In this example embodiment, the impact to passing any given gap rule is +10. However, failing the first gap rule A1 has a very large negative impact of −104. Failing the second gap rule A2, has a lesser, but still large negative impact of −103. Failing gap rule A3, an optional gap rule, has a negative impact of −102. The numeric values are assigned to execute the overall concept that any valid gap must pass all required gap rules. The output of the gap selection algorithm is a prioritized list of gaps 610.

Initially, the gaps are given an initial priority. The gap with the highest priority value is considered to be the most preferred gap. The initial priority determines the order in which the gaps are evaluated.

Table 1 shows the initial priority:

TABLE 1

| | A1 result | A2 result | A3 result | Priority Score |
|---|---|---|---|---|
| Gap 1 | — | — | — | 4 |
| Gap 2 | — | — | — | 3 |
| Gap 3 | — | — | — | 2 |
| Gap 4 | — | — | — | 1 |

Because Gap 1 has the highest initial priority value, it is processed by the algorithm first. Gap 1 passes gap rule A1, which has a positive impact on the priority. In this case, passing A1 increases the priority score by 10. Gap 1 then fails gap rule A2. Failing an gap rule has a much greater impact on the priority. In this case, because A2 is a required gap rule, the impact to the priority is −1000. In order to ensure that gaps failing required gap rules are assigned low priority, a large negative impact is assigned. Because Gap 1 has failed a required gap rule, the evaluation of Gap 1 is paused, and other gaps may be analyzed.

Table 2 shows the results following the processing of Gap 1:

TABLE 2

| | A1 result | A2 result | A3 result | Priority Score |
|---|---|---|---|---|
| Gap 1 | True | False | — | −986 (4 + 10 − 1000) |
| Gap 2 | — | — | — | 3 |
| Gap 3 | — | — | — | 2 |
| Gap 4 | — | — | — | 1 |

Next, Gap 2 is processed. Gap 2 passes gap rule A1, which has the same impact to the priority of Gap 2 as described above with regard to Gap 1 (+10 to priority score). At the next step, Gap 2 passes gap rule A2. Passing gap rule A2 has the same impact to priority score as described in reference to A1 (+10 to priority score). Gap 2 then fails gap rule A3. This has a negative effect on the priority score, but because gap rule A3 is ranked lower than gap rules A1 and A2, the impact is lesser than described above with regard to gap rules A1 or A2. Failing gap rule A3 applies −100 to the priority score. Processing Gap 2 is complete.

Table 3 shows the results following the processing of Gap 2:

TABLE 3

| | A1 result | A2 result | A3 result | Priority Score |
|---|---|---|---|---|
| Gap 1 | True | False | — | −986 |
| Gap 2 | True | True | False | −77 (3 + 10 + 10 − 100) |
| Gap 3 | — | — | — | 2 |
| Gap 4 | — | — | — | 1 |

Gap 3 is processed next. Gap 3 passes gap rule A1, which applies +10 to the priority score. Gap 3 also passes gap rule A2, which again, applies +10 to the priority score. Finally, Gap 3 passes gap rule A3 which applies +10 to the priority score. Because Gap 3 passed all the gap rules, the processing of Gap 3 is complete and can be considered a valid gap. In some embodiments, Gap 3 may be selected as the best gap, and the evaluation would be stopped without evaluating Gap 4, because Gap 3 has passed all the gap rules, achieving a perfect score. In other words, there is no possibility that Gap 4 will have a higher score.

Table 4 shows the results following the processing of Gap 3:

TABLE 4

| | A1 result | A2 result | A3 result | Priority Score |
|---|---|---|---|---|
| Gap 1 | True | False | — | −986 |
| Gap 2 | True | True | False | −77 |
| Gap 3 | True | True | True | 32 (2 + 10 + 10 + 10) |
| Gap 4 | — | — | — | 1 |

Finally, Gap 4 is processed. Gap 4 fails A1. Because this is the highest level required gap rule, a large negative impact (−10000) is assigned to the priority score. The processing of Gap 4 is complete.

Table 5 shows the results following the processing of Gap 4:

TABLE 5

| | A1 result | A2 result | A3 result | Priority Score |
|---|---|---|---|---|
| Gap 1 | True | False | — | −986 |
| Gap 2 | True | True | False | −77 |
| Gap 3 | True | True | True | 32 |
| Gap 4 | False | — | — | −9999 (1 − 10000) |

At this point, the processing of the algorithm is complete. In this case, Gaps 2 and 3 did not fail any required gap rules, and therefore are both considered valid. Gap 3 is preferred, as the priority score is higher. There is no need to continue with the evaluation of Gaps 1 or 4, as they have both failed required gap rules.

The above is an example of how the priority score may be implemented, but any suitable means of executing the score utilizing the binary results of the gap rules may be used.

An example technical effect of the methods, systems, and apparatus described herein includes at least one of: (a) providing a simplified method for evaluating gaps, wherein the result can be easily parsed for troubleshooting purposes; (b) required and optional gap rules can be employed in order to more efficiently analyze the gaps either by i) pausing evaluation of nonideal gaps early in the process or ii) by allowing for required and optional thresholds to be set for the same characteristic of a gap; or (c) utilizing the priority score structure to prioritize the best gaps of the valid gaps.

Some embodiments involve the use of one or more electronic processing or computing devices. As used herein, the terms "processor" and "computer" and related terms, e.g., "processing device," and "computing device" are not limited to just those integrated circuits referred to in the art as a computer, but broadly refers to a processor, a processing device or system, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processor (DSP), an application specific integrated circuit (ASIC), and other programmable circuits or processing devices capable of executing the functions described herein, and these terms are used interchangeably herein. These processing devices are generally "configured" to execute functions by programming or being programmed, or by the provisioning of instructions for execution. The above examples are not intended to limit in any way the definition or meaning of the terms processor, processing device, and related terms.

The various aspects illustrated by logical blocks, modules, circuits, processes, algorithms, and algorithm steps described above may be implemented as electronic hardware, software, or combinations of both. Certain disclosed components, blocks, modules, circuits, and steps are described in terms of their functionality, illustrating the interchangeability of their implementation in electronic hardware or software. The implementation of such functionality varies among different applications given varying system architectures and design constraints. Although such implementations may vary from application to application, they do not constitute a departure from the scope of this disclosure.

Aspects of embodiments implemented in software may be implemented in program code, application software, application programming interfaces (APIs), firmware, middleware, microcode, hardware description languages (HDLs), or any combination thereof. A code segment or machine-executable instruction may represent a procedure, a function, a subprogram, a routine, a subroutine, a module, a software package, a class, or any combination of instructions, data structures, or program statements. A code segment may be coupled to, or integrated with, another code segment or a electronic hardware by passing or receiving information, data, arguments, parameters, memory contents, or memory locations. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the disclosed functions may be embodied, or stored, as one or more instructions or code on or in memory. In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROM, DVD, and any other digital source such as a network, a server, cloud system, or the Internet, as well as yet to be developed digital means, with the sole exception being a transitory propagating signal. The methods described herein may be embodied as executable instructions, e.g., "software" and "firmware," in a non-transitory computer-readable medium. As used herein, the terms "software" and "firmware" are interchangeable, and include any computer program stored in memory for execution by personal computers, workstations, clients, and servers. Such instructions, when executed by a processor, configure the processor to perform at least a portion of the disclosed methods.

As used herein, an element or step recited in the singular and proceeded with the word "a" or "an" should be understood as not excluding plural elements or steps unless such exclusion is explicitly recited. Furthermore, references to "one embodiment" of the disclosure or an "exemplary embodiment" are not intended to be interpreted as excluding the existence of additional embodiments that also incorporate the recited features. Likewise, limitations associated with "one embodiment" or "an embodiment" should not be interpreted as limiting to all embodiments unless explicitly recited.

Disjunctive language such as the phrase "at least one of X, Y, or Z," unless specifically stated otherwise, is generally intended, within the context presented, to disclose that an item, term, etc. may be either X, Y, or Z, or any combination thereof (e.g., X, Y, and/or Z). Likewise, conjunctive language such as the phrase "at least one of X, Y, and Z," unless specifically stated otherwise, is generally intended, within the context presented, to disclose at least one of X, at least one of Y, and at least one of Z.

The disclosed systems and methods are not limited to the specific embodiments described herein. Rather, components of the systems or steps of the methods may be utilized independently and separately from other described components or steps.

This written description uses examples to disclose various embodiments, which include the best mode, to enable any person skilled in the art to practice those embodiments, including making and using any devices or systems and performing any incorporated methods. The patentable scope is defined by the claims and may include other examples that occur to those skilled in the art. Such other examples are intended to be within the scope of the claims if they have structural elements that do not differ from the literal language of the claims, or if they include equivalent structural elements with insubstantial differences form the literal language of the claims.

What is claimed is:

1. A gap evaluation system for evaluating potential gaps for lane change operations of an autonomous vehicle comprising a plurality of sensors, the gap evaluation system comprising at least one processor and at least one memory, wherein, upon receiving an indication for a lane change operation, the at least one processor is configured to:

receive, from the plurality of sensors, sensor data corresponding to a plurality of potential gaps between objects in a lane of a roadway into which the autonomous vehicle merges;

generate a profile for each potential gap using the sensor data, the profile of each potential gap including a plurality of characteristics associated with each potential gap;

retrieve a plurality of gap rules from the at least one memory, wherein each gap rule is directed to a characteristic of the plurality of characteristics and wherein each gap rule comprises a threshold value corresponding to the characteristic;

evaluate each potential gap against the plurality of gap rules by comparing the profile for each potential gap to the threshold value of each gap rule;

generate a prioritized list of gaps based on the evaluation of the plurality of potential gaps; and control operation of the autonomous vehicle, based at least in part on the prioritized list of gaps, wherein upon a failure of a required gap rule for any of the plurality of potential gaps, the gap evaluation system pauses evaluation of the potential gap.

2. The system of claim 1, wherein evaluating each potential gap against the plurality of gap rules further includes obtaining a binary result for each gap rule based upon the threshold value.

3. The system of claim 1, wherein each of the plurality of gap rules is classified as required or optional.

4. The system of claim 2, wherein the result of each gap rule is assigned a numeric value.

5. The system of claim 4, wherein a sum of the assigned numeric values corresponding to the evaluated gap rules is used to generate a priority score for each potential gap.

6. The system of claim 5, wherein the priority score is used to make a final gap selection.

7. A method of selecting a gap for a lane change operation of an autonomous vehicle, the method comprising:

receiving, from a plurality of sensors, sensor data corresponding to a plurality of potential gaps between objects in a lane of a roadway into which the autonomous vehicle merges;

generating a profile for each potential gap using the sensor data, the profile of each potential gap including a plurality of characteristics associated with each potential gap into which the autonomous vehicle merges;

retrieving a plurality of gap rules from at least one memory, wherein each gap rule is directed to a characteristic of the plurality of characteristics and wherein each gap rule comprises a threshold value corresponding to the characteristic;

evaluating each potential gap against the plurality of gap rules, failing each gap rule of the plurality of gap rules assigned with a different negative numeric value according to priority of each gap rule by assigning failing a gap rule of a higher priority with a lower negative numeric value than failing a gap rule of a lower priority, wherein evaluating each potential gap further comprises:

for each gap rule, comparing the profile for each potential gap to the threshold value of each gap rule; and determining a priority score of each potential gap against each gap rule, based on the comparison and a corresponding assigned numeric value of passing or failing each gap rule; and determining the priority score of each potential gap across the plurality of gap rules, based on the priority score of the each potential gap against each gap rule;

generating a prioritized list of gaps based on the evaluation of the plurality of potential gaps and respective priority scores of the plurality of potential gaps; and controlling operation of the autonomous vehicle, based at least in part on the prioritized list of gaps.

8. The method of claim 7, wherein evaluating each potential gap against the plurality of gap rules further includes obtaining a binary result for each gap rule based upon the threshold value.

9. The method of claim 7, wherein each of the plurality of gap rules is classified as required or optional.

10. The method of claim 9, wherein upon a failure of a required gap rule for any of the plurality of potential gaps, automatically pausing the evaluation of the potential gap.

11. The method of claim 8, wherein the result of each gap rule is assigned a numeric value.

12. The method of claim 11, wherein a sum of the assigned numeric values corresponding to the evaluated gap rules is used to generate a priority score for each potential gap.

13. The method of claim 12, wherein the priority score is used to make a final gap selection.

14. An autonomous vehicle comprising:

a plurality of sensors; and a gap evaluation system comprising at least one processor and at least one memory, wherein, upon receiving an indication for a lane change operation, the at least one processor is configured to:

receive, from the plurality of sensors, sensor data corresponding to a plurality of potential gaps between objects in a lane of a roadway into which the autonomous vehicle merges;

generate a profile for each potential gap using the sensor data, the profile of each potential gap including a plurality of characteristics associated with each potential gap;

retrieve a plurality of gap rules, wherein each gap rule is directed to a characteristic of the plurality of characteristics and wherein each gap rule comprises a threshold value corresponding to the characteristic;

evaluate each potential gap against the plurality of gap rules by comparing the profile for each potential gap to the threshold value of each gap rule;

generate a prioritized list of gaps based on the evaluation of the plurality of potential gaps; and control operation of the autonomous vehicle, based at least in part on the prioritized list of gaps, wherein upon a failure of a required gap rule for any of the plurality of potential gaps, the gap evaluation system pauses the evaluation of the potential gap.

15. The autonomous vehicle of claim 14, wherein evaluating each potential gap against the plurality of gap rules further includes obtaining a binary result for each gap rule based upon the threshold value.

16. The autonomous vehicle of claim 14, wherein each of the plurality of gap rules is classified as required or optional.

17. The autonomous vehicle of claim 15, wherein the result of each gap rule is assigned a numeric value.

18. The autonomous vehicle of claim 17, wherein a sum of the assigned numeric values corresponding to the evaluated gap rules is used to generate a priority score for each potential gap.

19. The autonomous vehicle of claim 18, wherein the priority score is used to make a final gap selection.

* * * * *